United States Patent
Carbune et al.

(10) Patent No.: US 11,568,870 B2
(45) Date of Patent: Jan. 31, 2023

(54) AUTOMATED ASSISTANT FOR FACILITATING COMMUNICATIONS THROUGH DISSIMILAR MESSAGING FEATURES OF DIFFERENT APPLICATIONS

(71) Applicant: Google LLC, Mountain View, CA (US)

(72) Inventors: Victor Carbune, Zurich (CH); Matthew Sharifi, Kilchberg (CH)

(73) Assignee: Google LLC, Mountain View, CA (US)

(*) Notice: Subject to any disclaimer, the term of this patent is extended or adjusted under 35 U.S.C. 154(b) by 204 days.

(21) Appl. No.: 17/110,046

(22) Filed: Dec. 2, 2020

(65) Prior Publication Data

US 2022/0172715 A1 Jun. 2, 2022

(51) Int. Cl.
*G10L 15/22* (2006.01)
*H04L 51/56* (2022.01)
*G10L 15/18* (2013.01)

(52) U.S. Cl.
CPC .......... *G10L 15/22* (2013.01); *G10L 15/1815* (2013.01); *H04L 51/56* (2022.05); *G10L 2015/223* (2013.01)

(58) Field of Classification Search
CPC ...................................................... G10L 15/22
See application file for complete search history.

(56) References Cited

U.S. PATENT DOCUMENTS

2016/0260436 A1 9/2016 Lemay et al.
2020/0202846 A1* 6/2020 Bapna ................. G10L 15/1815

FOREIGN PATENT DOCUMENTS

| EP | 2273491    | 1/2011 |
|----|------------|--------|
| EP | 3430514    | 1/2019 |
| EP | 3454227    | 3/2019 |
| WO | 2018077655 | 5/2018 |

OTHER PUBLICATIONS

European Patent Office; International Search Report and Written Opinion of Application No. PCT/US2021/060301; 18 pages; dated Mar. 2, 2022.

* cited by examiner

*Primary Examiner* — Ibrahim Siddo

(74) *Attorney, Agent, or Firm* — Gray Ice Higdon

(57) ABSTRACT

Implementations relate to an automated assistant that can respond to communications received via a third party application and/or other third party communication modality. The automated assistant can determine that the user is participating in multiple different conversations via multiple different third party communication services. In some implementations, conversations can be processed to identify particular features of the conversations. When the automated assistant is invoked to provide input to a conversation, the automated assistant can compare the input to the identified conversation features in order to select the particular conversation that is most relevant to the input. In this way, the automated assistant can assist with any of multiple disparate conversations that are each occurring via a different third party application.

16 Claims, 10 Drawing Sheets

US 11,568,870 B2

AUTOMATED ASSISTANT FOR FACILITATING COMMUNICATIONS THROUGH DISSIMILAR MESSAGING FEATURES OF DIFFERENT APPLICATIONS

BACKGROUND

Humans may engage in human-to-computer dialogs with interactive software applications referred to herein as "automated assistants" (also referred to as "digital agents," "chatbots," "interactive personal assistants," "intelligent personal assistants," "conversational agents," etc.). For example, humans (which when they interact with automated assistants may be referred to as "users") may provide commands and/or requests using spoken natural language input (i.e., utterances) which may in some cases be converted into text and then processed, and/or by providing textual (e.g., typed) natural language input.

In some instances, an automated assistant can be invoked to send, for example, a short message service (SMS) message on behalf of a user to another user. However, such a feature can be limited to an original equipment manufacturer (OEM) messaging application that is provided by the same entity that provides access to the automated assistant. This limitation can cause a user to directly and extensively interact with a touch interface of a computing device in order to send messages through other communication platform(s). For example, many users tend to communicate through comments, threads, emails, and/or other computerized communication platforms, which may not be accessible through an OEM messaging application and/or controllable via an automated assistant. As a result, a user may necessarily have to navigate to and launch a third party application in order to reply to a comment in the third party application (e.g., an exercise application that is a third party application relative to the automated assistant). This can result in excess usage of battery life and/or processing resources of the computing device. Further, even for a non-OEM messaging application that interfaces with an automated assistant, to send a message through the non-OEM messaging application a corresponding user must recall an alias, for the non-OEM messaging application, that is recognized by the automated assistant, and correctly recite the alias in providing an utterance to the automated assistant. This can result in a prolonged duration of, and/or greater quantity of, user input(s) in sending the message. Further, the alias can be obscure and hard to recall, leading to failure to recall the alias and/or requiring further user inputs to identify the alias.

SUMMARY

Implementations set forth herein relate to an automated assistant that can further conversations between persons that are communicating via a particular application, without necessitating that a user specify the particular application. The particular application can be identified by the automated assistant using information that may be gleaned, with prior permission from the user, as the user participates in various conversations through their respective applications. In this way, conversations occurring through various modalities, such as via comments and other in-app chat interfaces, can be subject to automated assistant control. Such control can allow users to send messages to others without relying on an OEM messaging application and/or without necessitating that the user specify a particular application via which a message is to be sent. This can allow users to preserve computational resources, such as battery life, memory, CPU/ GPU processing power, and network bandwidth, which may otherwise be consumed when a user accesses a display-enabled device in order to manually identify an application via which a message is to be sent, to launch the application, and/or to manually type comments and/or other messages into a display interface of the application.

Additionally, implementations disclosed herein can automatically select, from a plurality of candidate applications, a particular application via which to send a message that is conveyed in a spoken utterance of a user. Those implementations can automatically select the particular application despite the spoken utterance (or any other preceding or following user input) failing to explicitly specify the particular application. As one example, the particular application can be automatically selected and the message automatically sent via the particular application without requiring any user confirmation. As another example, the particular application can be automatically selected, a prompt presented to the user to confirm the particular application (e.g., with a spoken "yes" response or other brief affirmative input), and the message sent via the particular application in response to receiving affirmative input in response to the prompt. In these and other manners, a quantity and/or duration of user input(s) required to send a message via the particular application can be reduced, at least due to the user input(s) not needing to explicitly specify the particular application. For example, by not needing to explicitly specify the particular application the quantity of terms in the spoken utterance can be reduced. As another example, by not needing to explicitly specify the particular application, the user need not pause during speaking in order to recollect the specific alias(es), for the particular application, that are recognized by the automated assistant. For instance, the application can be a running application that includes a specific alias, of "Victor's Superb Zurich Running App", that is the only alias for the application that is recognized by the automated assistant. Despite being an excellent alias, it may be difficult for a user to recall, leading to long pauses and/or even requiring users to manually scan a list of apps on their computing device in order to recall the alias.

As a working example of some instances, a user may participate in a conversation via "posts" made in an exercise application. The exercise application can include a feature that allows for a comment thread to extend from each post made by the user regarding a particular run or other exercise that the user has completed. Although the exercise application may not be a modality of electronic communication that the user most frequently employs for conversations, the user may nonetheless rely on the exercise application for participating in certain types of conversations. In some situations, the user may rely on their automated assistant to send electronic communications via a default or OEM messaging application. However, in implementations provided herein, the user can also invoke the automated assistant to communicate with other users via other applications that offer messaging functionality—without the user explicitly directing the automated assistant to a particular application.

For example, when a user is associated with multiple communications occurring via different applications, the user can command the automated assistant to submit a message in furtherance of a particular conversation and/or in order to reply to another user (e.g., their friend Luke). For instance, when the user sees a notification regarding a video that another user posted on a video editing application, the user can provide a spoken utterance such as, "Assistant, tell Luke that 'I like the choreography in this video.'" In response, the automated assistant can perform one or more operations in order to identify a particular conversation and/or application that the user is targeting with the spoken utterance.

For example, in response to the spoken utterance, the automated assistant can process audio data characterizing the spoken utterance in order to identify a conversation and/or application that is most related to the spoken utterance. In some implementations, the automated assistant can establish identifiers for conversations that the user can participate in and/or is participating in. The automated assistant can become aware of the conversations through notifications, interfaces, applications, and/or other data that can be accessible to a computing device. For example, and in accordance with the aforementioned example, when the other user, "Luke," posts the video on the video editing application, the computing device of the user can render a graphical notification. The graphical notification can include an image, text, and/or video that can be observed by the user. In some implementations, and with prior permission from the user and/or the other user, the automated assistant can generate an interaction identifier based on the notification.

In some implementations, multiple different identifiers can be generated for communications associated with various applications. For example, messages can be annotated with certain information such as sender, recipient, application, message, subject, URL, timestamp, and/or any other information regardless of how the messages became available. When such information is not readily available because a particular application does not follow a particular messaging protocol, contextual data can be processed in order to generate information for annotating message data. For example, and with prior permission from the user, screen content and/or other extracted content can be processed using one or more trained machine learning models for understanding screen content. In some implementations, content of messages can be processed using one or more trained machine learning models for identifying topics that may be associated with the messages and/or for generating summaries of those messages. An identified topic and/or summary can then be used when classifying communications in order that the automated assistant can identify a particular conversation and/or particular application in response to a request that is directed to that particular conversation and/or that particular application.

As an example, in response to the spoken utterance, "Assistant, tell Luke that 'I like the choreography in this video,'" the automated assistant can determine whether an existing conversation and/or application is associated with a person named "Luke." When the automated assistant identifies one or more conversations and/or applications associated with the person "Luke," the automated assistant can further identify a particular conversation and/or application. Alternatively, or additionally, the automated assistant can process audio data corresponding to the spoken utterance in order to identify a topic and/or summary of the spoken utterance, and determine a relevance of the spoken utterance to one or more conversations and/or applications. For example, historical interactions between the user and one or more applications can be characterized by application data that can be processed by the automated assistant in order to determine whether there are associations between the spoken utterance and prior interactions. When one or more terms from the spoken utterance are synonymous with an identified topic associated with a particular application, the automated assistant can select the particular application as the targeted application that the user intends to be affected by the spoken utterance. In some implementations, an embedding can be generated based on one or more interactions between the user and an application, and another embedding can be generated based on the spoken utterance. Alternatively, or additionally, an embedding can be generated based on a particular conversation, and another embedding can be generated based on the spoken utterance. When a distance between embeddings in latent space is determined to satisfy a threshold, the application or conversation associated with the non-utterance embedding (e.g., the embedding generated based on the interaction(s) and/or the particular conversation) can be selected by the automated assistant as being subject to one or more requests embodied in the spoken utterance.

In order to fulfill a request for the automated assistant to submit a message via a particular application, the automated assistant can employ a script and/or application programming interface (API). For example, application data characterizing user interactions with various different applications can be processed, either exclusively at a user's client device, or one or more different computing devices with prior permission from a user, in order to identify one or more operations to perform in order to submit a message via a particular application. The one or more operations can be embodied in a script, which can thereafter be employed during subsequent instances in which the user is requesting the automated assistant to submit another message via the particular application.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described herein. Yet other implementations may include a system of one or more computers that include one or more processors operable to execute stored instructions to perform a method such as one or more of the methods described herein.

It should be noted that the term "conversation," as used herein, can refer to one or more instances of data (e.g., an image, a video, text, and/or any other type of data) that one or more users can respond to with additional data using one or more applications.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
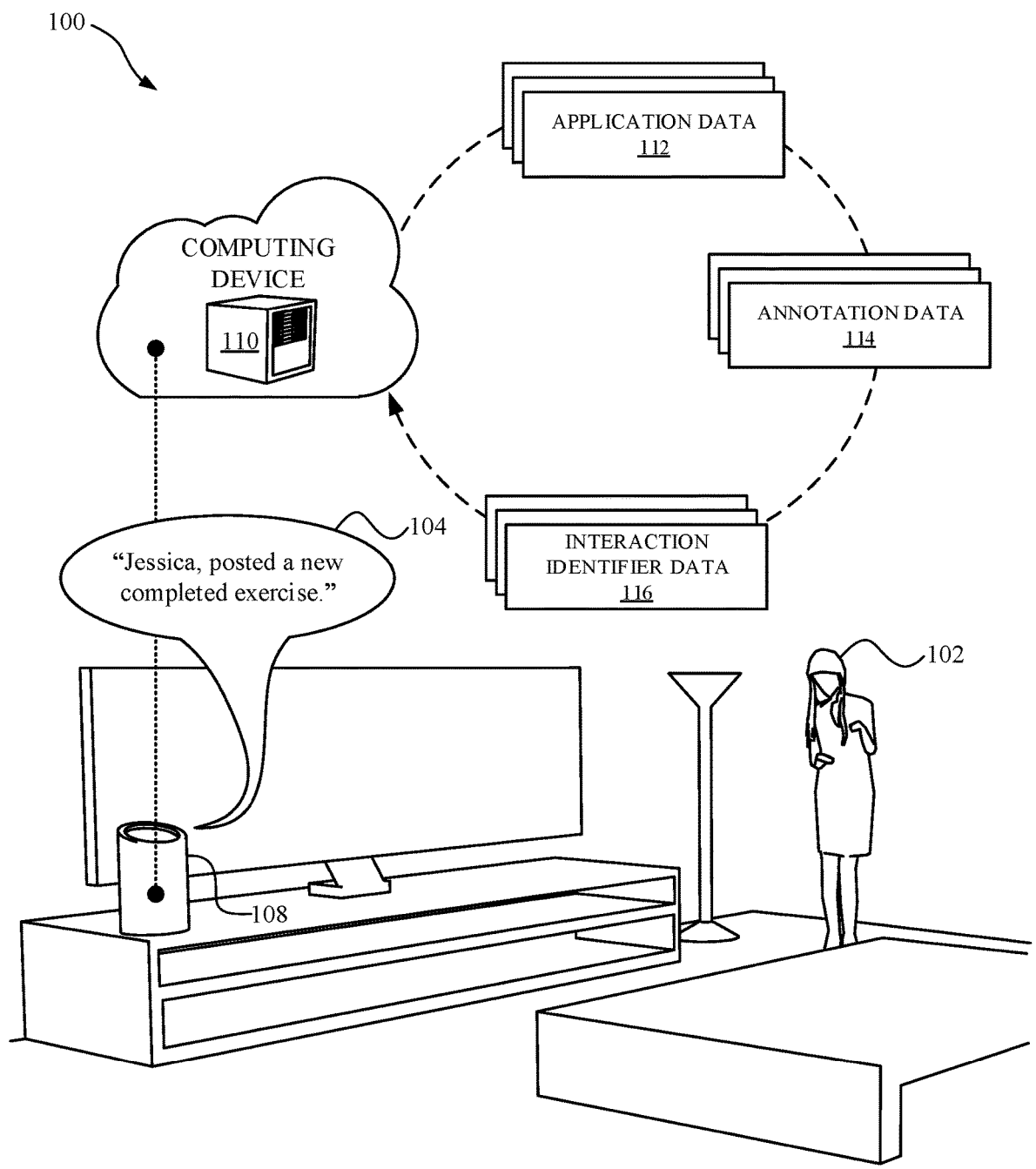
FIG. 1A, FIG. 1B, and FIG. 1C illustrate views of a user invoking an automated assistant to respond to a conversation without explicitly identifying a particular application.
Figure 1B:
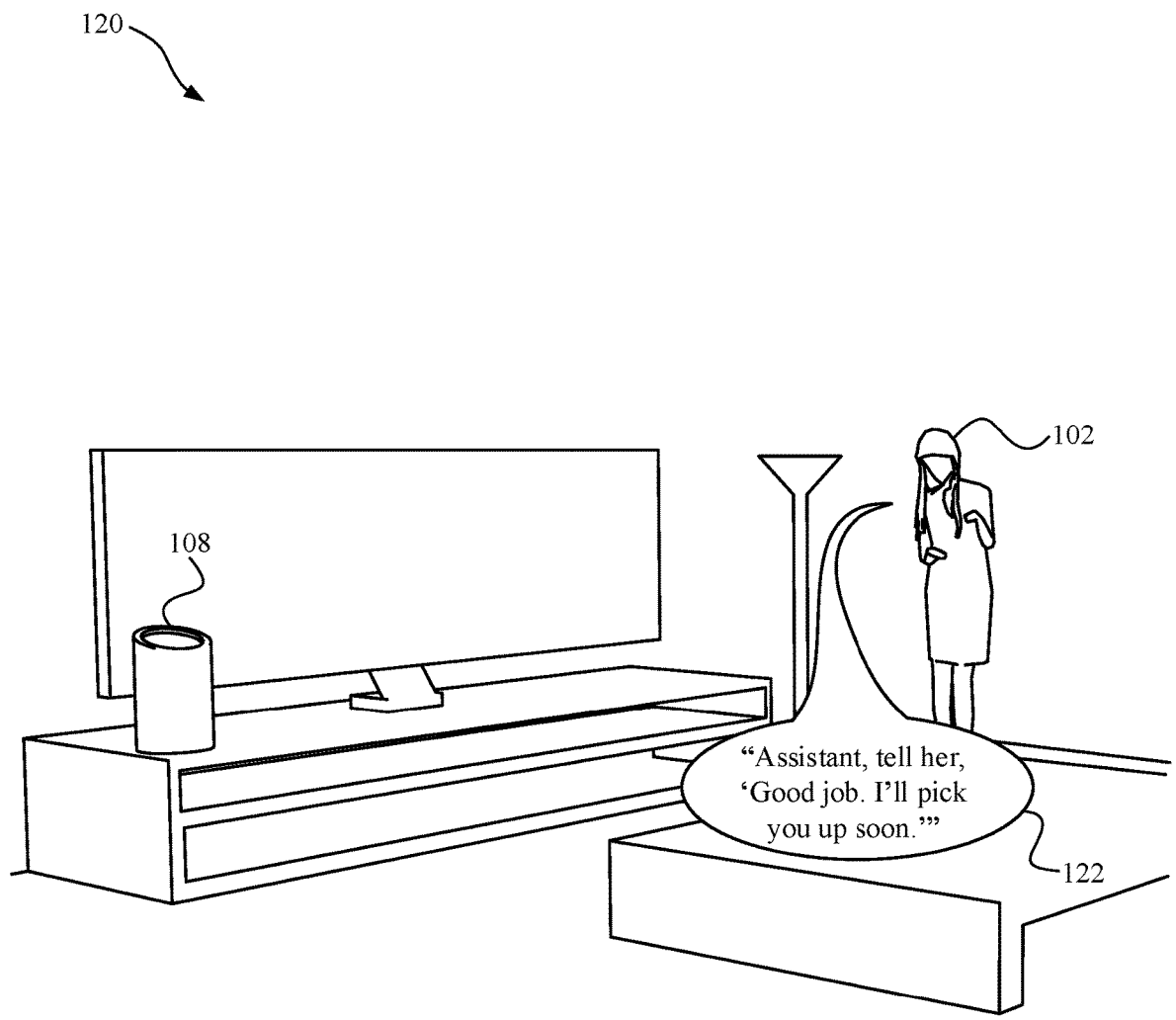
Figure 1C:
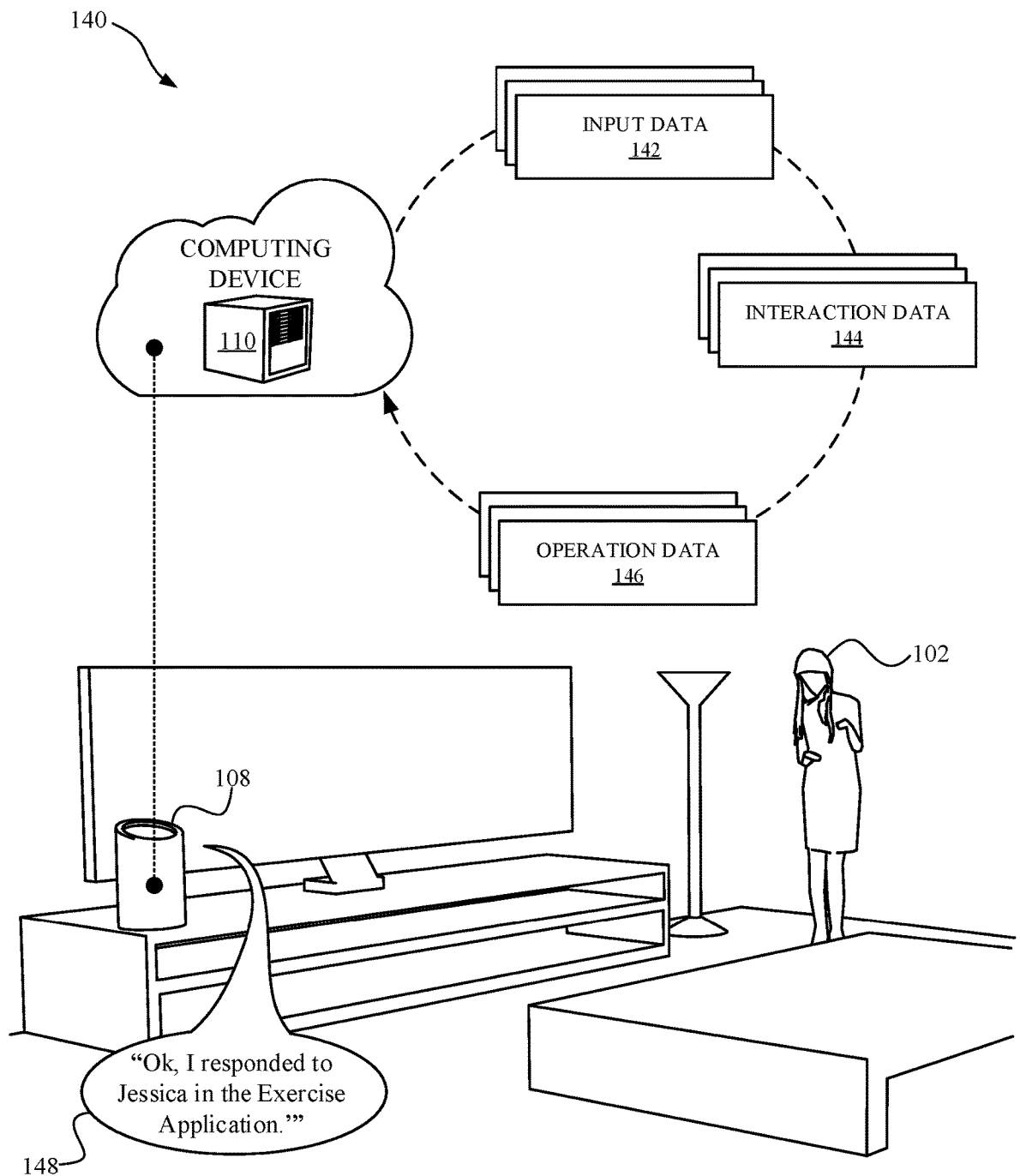

FIG. 1A, FIG. 1B, and FIG. 1C illustrate a view 100, a view 120, and a view 140, respectively, of a user 102 invoking an automated assistant to respond to a conversation without explicitly identifying a particular application. For example, an automated assistant that is accessible via a Computing device 108 can provide an output 104 such as, "Jessica, posted a new completed exercise." In order to provide this output 104, the computing device 108 can include an operating system through which an exercise application can communicate to an automated assistant application. Alternatively, or additionally, the computing device 108 can offload input processing to a separate computing device 110. In some implementations, the exercise application can provide application data 112, which can be processed by the computing device 110 and/or the computing device 108 in order to generate annotation data 114. The annotation data 114 can be used to correlate the application data 112 to an existing conversation or a new conversation. For example, the automated assistant can access conversation identifying data 116, which characterize multiple different conversations that may be occurring between multiple different users via multiple different applications. Alternatively, or additionally, the interaction identifier data 116 can be generated from The annotation beta 114 in order to establish a placeholder for a conversation that has just been initiated (e.g. by Jessica). For example, the interaction identifier data 116 conclude an ID such as "Identifier_J1," and can be stored in association with the annotation data 114 (e.g., @Name: "Jessica"; @Subject: [Exercise, Post]; @Application: "Exercise Application"; @Summary: "New Exercise").

In some instances, the user 102 can rely on the automated assistant to reply to content generated by another user, without the user 102 explicitly identifying an application or other modality through which to respond to the other user. For example, and as provided in view 120 of FIG. 1B, the user 102 can provide a spoken utterance 122 such as, "Assistant, tell her, 'Good job. I'll pick you up soon.'" Although the user 102 did not specify a name for the person who will be receiving the message, or the application with which to send the message, the automated assistant can nonetheless determine who the user 102 is referring to. Furthermore, the automated assistant can determine an application that the user 102 may be intending for the automated assistant to use when communicating with the other user.

For example, in response to receiving the spoken utterance 122, the automated assistant can process input data 142 corresponding to the spoken utterance in order to identify a particular application to use for communicating the response from the user 102. In some implementations, the automated assistant can determine that the input data 142 corresponds to a request for the automated assistant to communicate a message to another user. Based on this determination, the automated assistant can generate interaction data 144, which can be used to select a particular conversation and or a particular application for communicating the message. In some implementations, the interaction data 144 can include semantic understanding data that can characterize a semantic understanding of the spoken utterance 122. The semantic understanding data can then be compared to application data in order to determine a relevance of the spoken utterance 122 to a particular application. For example, the application data can indicate that the exercise application has most recently provided a notification, and that the user 102 has previously provided an input to the exercise application to indicate a congratulations (e.g., "Good job") and a time for pickup. Furthermore, a reference to the other user (e.g., "her") can provide a stronger correlation to the exercise application and the post from the other user. Based on this correlation, the automated assistant can select the recent post in the exercise application to be the intended target for the spoken utterance 122 from the user 102.

In some implementations, when the automated assistant has identified a particular conversation for a particular application to communicate a message from the user 102, the automated assistant can generate operation data 146 for submitting the message. In some implementations, the operation data 146 can characterize one or more operations to be executed by the automated assistant, an operating system, and/or the particular application that has been selected by the automated assistant. The operation data 146 can be based on prior instances in which the user 102 interacted with the particular application in order to communicate a message. In some implementations, one or more trained machine learning models can be used when processing the input data 142 in order to generate the operation data 146. The one or more trained machine learning models can be trained using screenshots, API data, application content, operating system data, and/or any other data that can be used to characterize activities of one or more applications. In this way, the automated assistant can adapt controlling operations for new applications, with prior permission from the user, without necessarily requiring an application programming interface for the new applications. When the automated assistant has caused the operations data 146 to be executed, and the message to be successfully provided to the other user, the automated assistant can provide an output 148 such as, "Ok, I responded to Jessica in the Exercise Application."

Figure 2A:
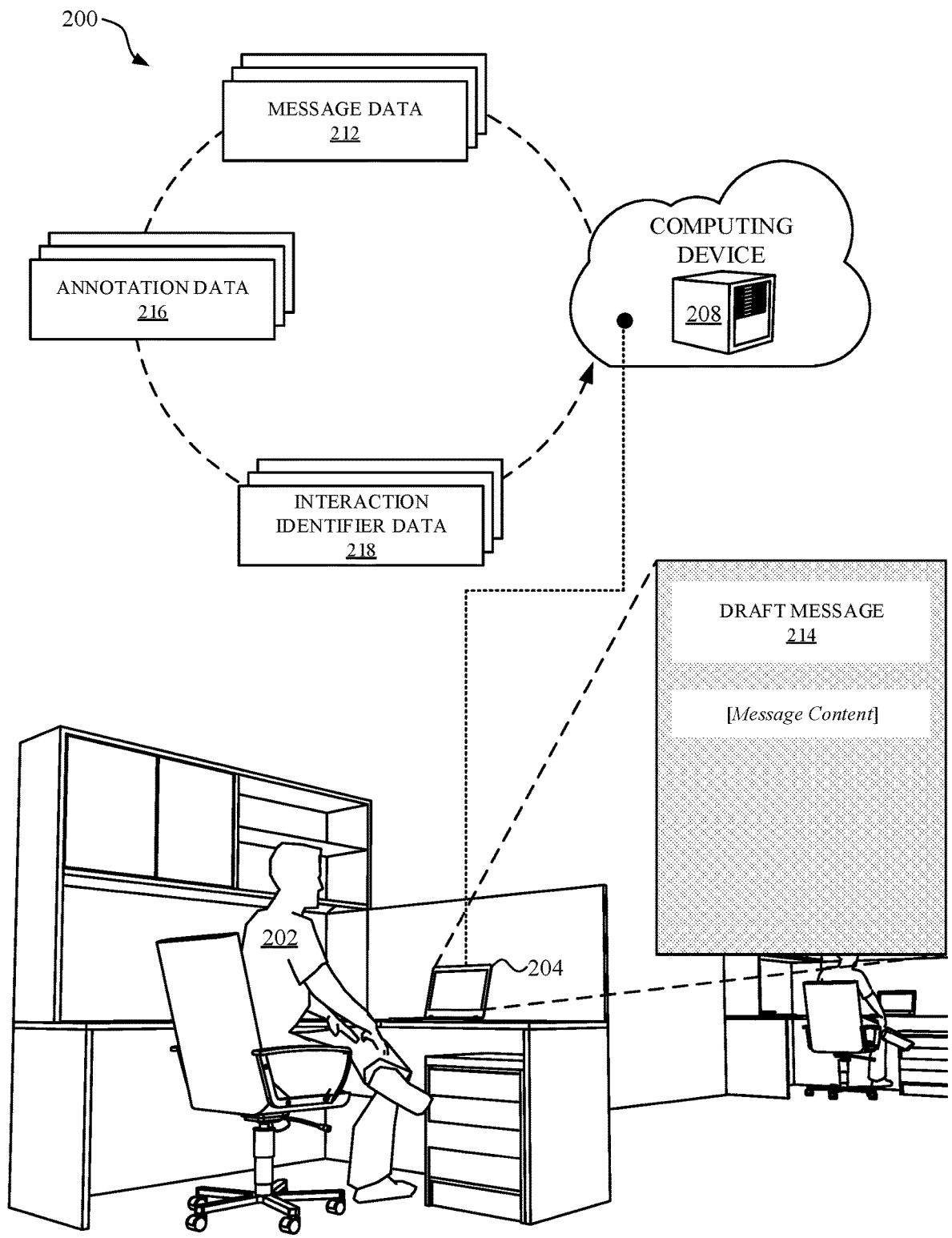
FIG. 2A, FIG. 2B, and FIG. 2C illustrate views of a user initializing conversation via a messaging application and, thereafter, invoking an automated assistant to provide another message to the conversation without specifying a particular application and/or a particular recipient.
Figure 2B:
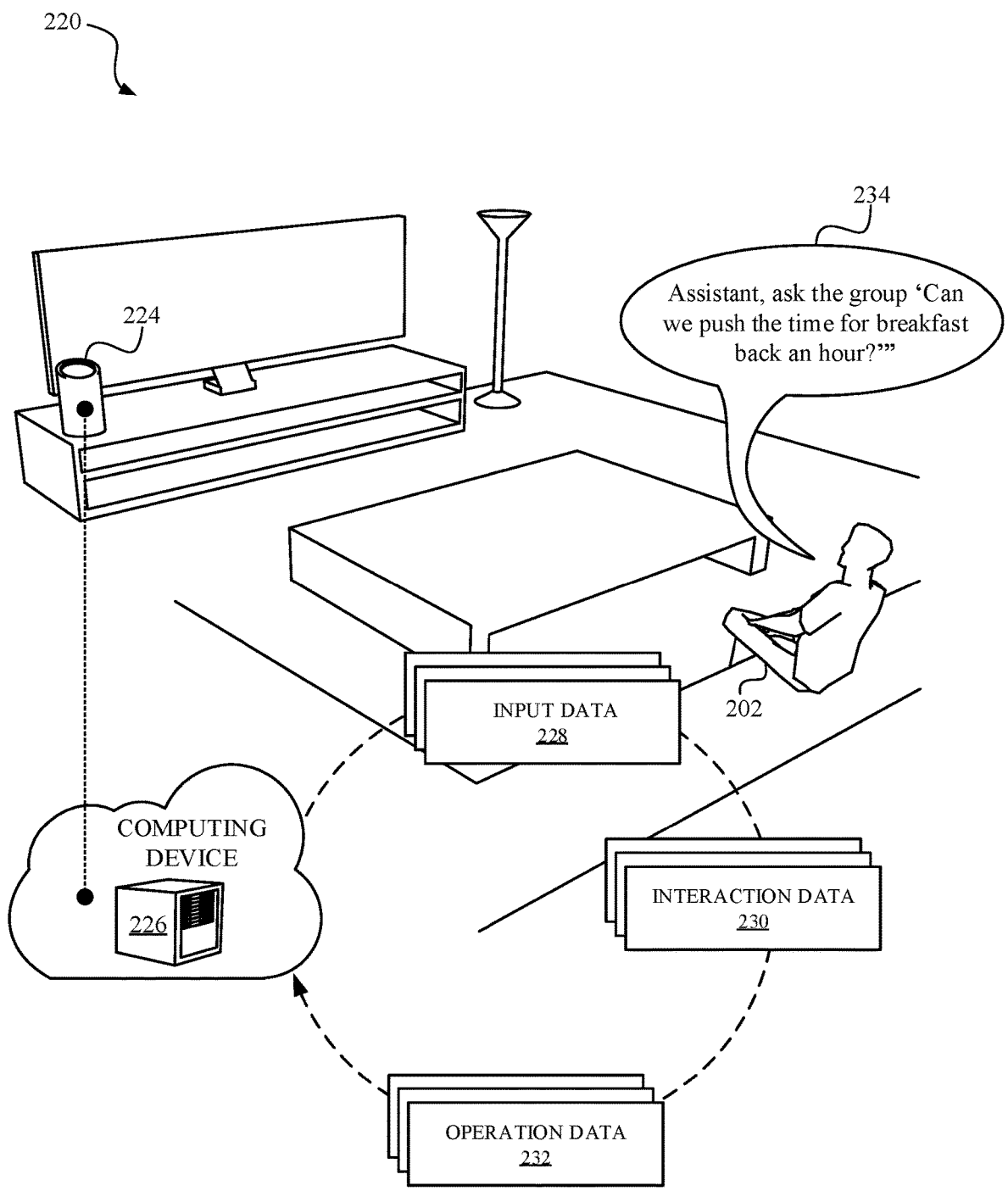
Figure 2C:
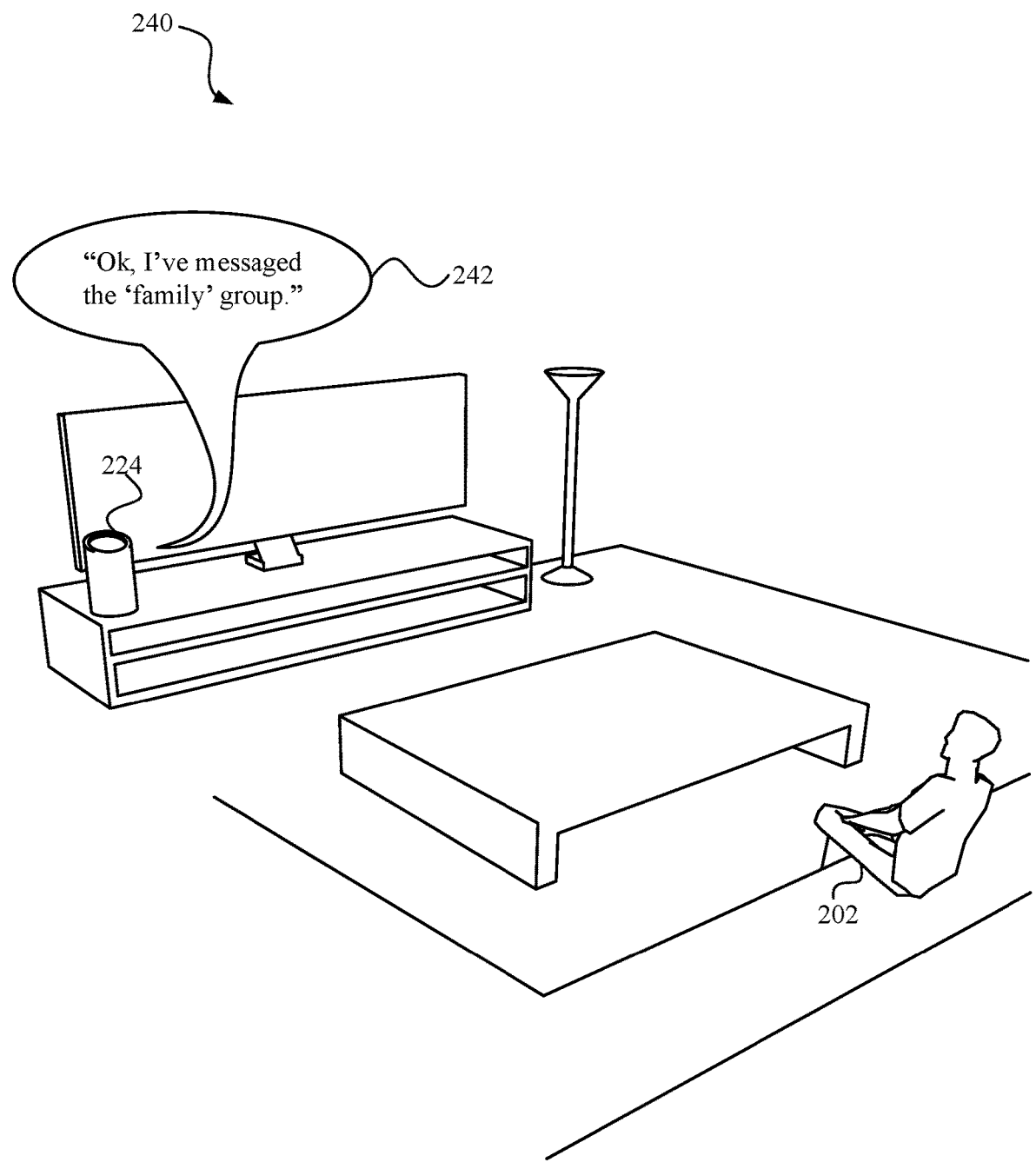

FIG. 2A, FIG. 2B, and FIG. 2C illustrate a view 200, a view 220, and a view 240 of a user 202 initializing conversation via a messaging application and, thereafter, invoking an automated assistant to provide another message to the conversation without specifying a particular application and/or a particular recipient. For example, the user 202 can be interacting with a Computing device 204 in order to create a draft message 214 that can be communicated to the group of people. The draft message 214 can be created through a third-party application and or any other application that is separate from an automated assistant application. For example, the draft message can be created at an email application that is provided by a third-party entity that is different from an entity that provides access to the automated assistant.

Based on the user 202 creating the draft message 214 and/or sending the draft message 214, an automated assistant, with prior permission from the user 202, can cause message data 212 to be processed in order to generate, and/or identify, an interaction identifier associated with the draft message 214. For example, message content, such as names of recipients, subject, body, time, location, and or any other message related data can be characterized by message data 212. The message data 212 can be processed at the getting device 204 and/or a separate computing device 208 in order to generate annotation data 216. In some implementations, the annotation data 216 can include and/or be associated with embedding data. For example, the message data 212 and is processed using one or more trained machine learning models in order to generate one or more embeddings that can be mapped to latent space. Thereafter, other message data can be processed in order to determine a distance between embeddings in space, which can indicate whether a particular message should be stored in association with an existing conversation and/or an existing message.

In some implementations, one or more embeddings can correspond to an interaction identifier, which can be associated with one or more different annotations. For example, annotation data 216 can be generated from the message data 212 and can characterize various features of the message data 212 and or features associated with the message data 212. For example, natural language understanding can be performed using portions of the message data 212 in order to identify subject matter that can pertain to the draft message 214. In some implementations, annotation data associated with multiple different messages processed in order to identify features at the draft message 214 that can be unique to the draft message 214 relative to other messages. When the draft message 214 corresponds to an initial message for a conversation, interaction identifier data 218 to be generated and stored such that the draft message 214 will not be considered an extension of an existing conversation. Therefore, in order for the automated assistant to correlate subsequent inputs to the existing conversation, the automated assistant can generate one or more annotations, embeddings, and/or any other data that can be compared to data stored and associated with the interaction identifier 218.

For example, and as shown in view 220 of FIG. 2B, The user 202 can participate in the conversation by providing a spoken utterance to the automated assistant, even though the conversation may be ongoing at an application that is not a default messaging application. The user 202 can provide a spoken utterance 230 at a subsequent point in the conversation when other recipients of the draft message 240 have already responded to the draft message 214. Each of the responses can also be processed in order to generate additional annotation data that can be stored in association with an interaction identifier for the ongoing conversation initialized by the draft message 214. In this way, the automated assistant can more readily classify inputs associated with an existing conversation without requiring the user 202 to manually interact with a touch interface of a computing device and/or without requiring the user 202 to explicitly identify recipients and/or applications for communicating a message.

For example, the user 202 can provide a spoken address 230 such as, "Assistant, ask the group 'Can we push the time for breakfast back an hour?'" The user 202 can provide the spoken utterance 230 to a computing device 224 that is connected to a different network than the computing device 204 that was used to draft the draft message 214. The computing device 224 and/or a separate device 226 can process input data 228 characterizing the spoken utterance 230 in order to identify one or more operations to perform based on the spoken utterance 230. For example, the input data 228 can be processed using one or more trained machine learning models in order to generate one or more embeddings. An embedding generated using the input data 228 can be mapped to latent space in order to determine a distance between the embedding and one or more previously generated embeddings. When the distance satisfies a threshold and/or is determined to be shorter than one or more other embedding distances, the embedding can be determined to be most relevant to the nearest existing embedding. When the nearest embedding corresponds to an existing conversation, the automated assistant can identify an application and/or annotations associated with the existing conversation.

For example, based on the spoken utterance 230, the automated assistant can identify interaction data 230 that corresponds to the stored embedding that was most relevant to the embedding generated from the input data 228. In some implementations, the interaction data 230 can include annotation data and/or other data that can identify participants of a conversation, one or more applications being used for the conversation, content of the conversation, and/or any other features of the conversation. Using the identified data, the automated assistant can generate operation data 232, which can direct a particular application to provide a message to one or more of the identified participants. For example, the automated assistant can generate a command for a particular application that causes the particular application to render a message for the other participants. The rendered message can include the content "Can we push breakfast back an hour?" and, when the automated assistant has completed submitting the message, the automated assistant can render an output 242 for the user 202. For example, and as provided in view 240 of FIG. 2C, the automated assistant can cause the computing device 224 to render the output 242, "Ok, I've messaged the 'family' group." Providing this output can allow the user 202 to confirm that the message was submitted to the intended participants. Alternatively, or additionally, when processing the input data 228, the automated assistant can identify the participants (e.g., the "family" group) and render a prompt for the user 202 to confirm before the automated assistant provides the message to the participants. Alternatively, or additionally, the message to be provided via the particular application can be rendered at a GUI interface so that the user 202 can confirm that the message has the intended content. For example, the particular application can include a text field, which the automated assistant can incorporate natural language content of the message into.

Figure 3:
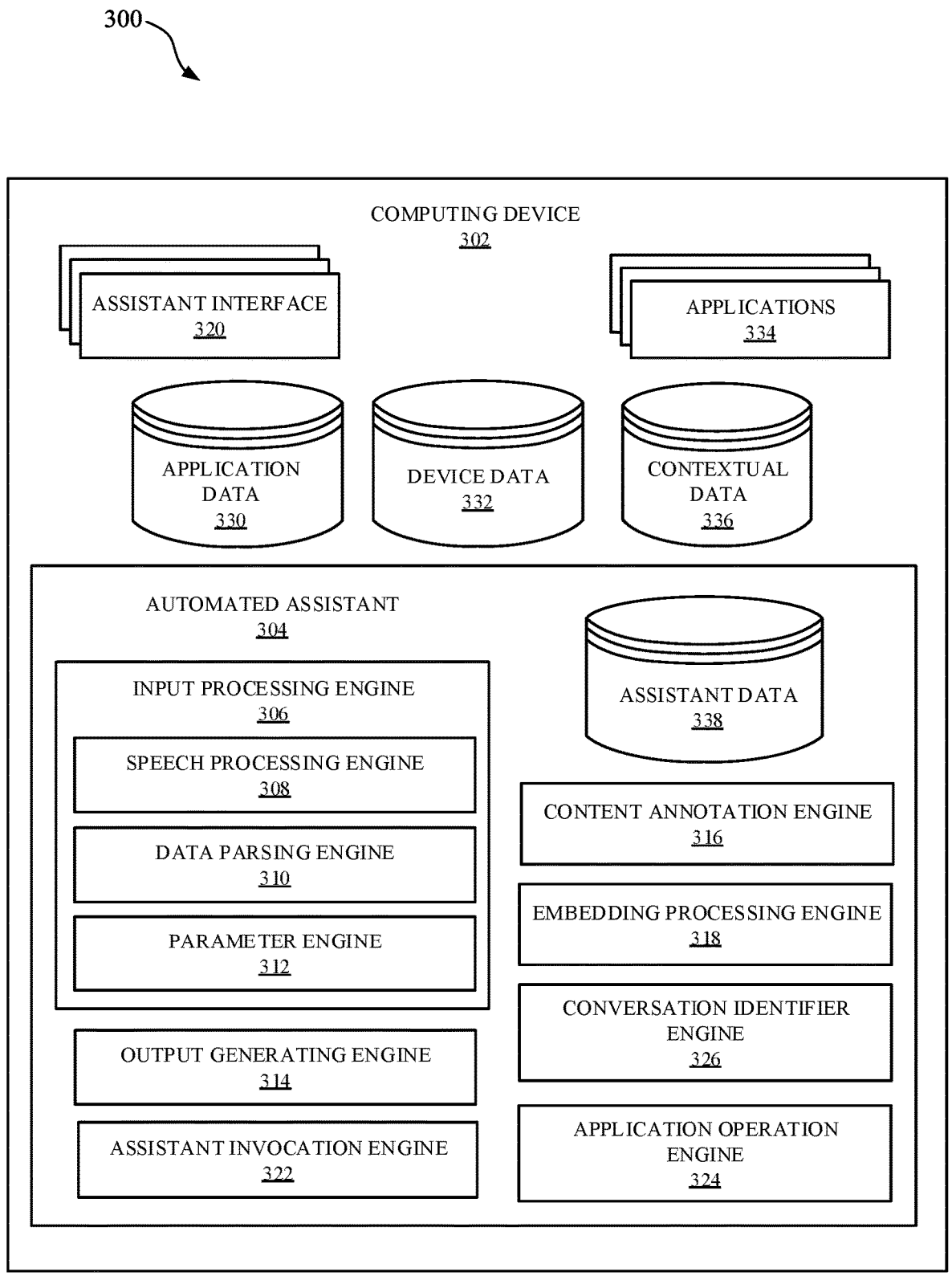
FIG. 3 illustrates a system that determines whether to offload computational tasks using network metrics that are not limited to signal strength, and that may be based on recent interactions between a user and an automated assistant.

FIG. 3 illustrates a system 300 that determines whether to offload computational tasks using network metrics that are not limited to signal strength, and that may be based on recent interactions between a user and an automated assistant 304. The automated assistant 304 can operate as part of an assistant application that is provided at one or more computing devices, such as a computing device 302 and/or a server device. A user can interact with the automated assistant 304 via assistant interface(s) 320, which can be a microphone, a camera, a touch screen display, a user interface, and/or any other apparatus capable of providing an interface between a user and an application. For instance, a user can initialize the automated assistant 304 by providing a verbal, textual, and/or a graphical input to an assistant interface 320 to cause the automated assistant 304 to initialize one or more actions (e.g., provide data, control a peripheral device, access an agent, generate an input and/or an output, etc.). Alternatively, the automated assistant 304 can be initialized based on processing of contextual data 336 using one or more trained machine learning models. The contextual data 336 can characterize one or more features of an environment in which the automated assistant 304 is accessible, and/or one or more features of a user that is predicted to be intending to interact with the automated assistant 304.

The computing device 302 can include a display device, which can be a display panel that includes a touch interface for receiving touch inputs and/or gestures for allowing a user to control applications 334 of the computing device 302 via the touch interface. In some implementations, the computing device 302 can lack a display device, thereby providing an audible user interface output, without providing a graphical user interface output. Furthermore, the computing device 302 can provide a user interface, such as a microphone, for receiving spoken natural language inputs from a user. In some implementations, the computing device 302 can include a touch interface and can be void of a camera, but can optionally include one or more other sensors.

The computing device 302 and/or other third party client devices can be in communication with a server device over a network, such as the internet. Additionally, the computing device 302 and any other computing devices can be in communication with each other over a local area network (LAN), such as a Wi-Fi network. The computing device 302 can offload computational tasks to the server device in order to conserve computational resources at the computing device 302. For instance, the server device can host the automated assistant 304, and/or computing device 302 can transmit inputs received at one or more assistant interfaces 320 to the server device. However, in some implementations, the automated assistant 304 can be hosted at the computing device 302, and various processes that can be associated with automated assistant operations can be performed at the computing device 302.

In various implementations, all or less than all aspects of the automated assistant 304 can be implemented on the computing device 302. In some of those implementations, aspects of the automated assistant 304 are implemented via the computing device 302 and can interface with a server device, which can implement other aspects of the automated assistant 304. The server device can optionally serve a plurality of users and their associated assistant applications via multiple threads. In implementations where all or less than all aspects of the automated assistant 304 are implemented via computing device 302, the automated assistant 304 can be an application that is separate from an operating system of the computing device 302 (e.g., installed "on top" of the operating system)—or can alternatively be implemented directly by the operating system of the computing device 302 (e.g., considered an application of, but integral with, the operating system).

In some implementations, the automated assistant 304 can include an input processing engine 306, which can employ multiple different modules for processing inputs and/or outputs for the computing device 302 and/or a server device. For instance, the input processing engine 306 can include a speech processing engine 308, which can process audio data received at an assistant interface 320 to identify the text embodied in the audio data. The audio data can be transmitted from, for example, the computing device 302 to the server device in order to preserve computational resources at the computing device 302. Additionally, or alternatively, the audio data can be exclusively processed at the computing device 302.

The process for converting the audio data to text can include a speech recognition algorithm, which can employ neural networks, and/or statistical models for identifying groups of audio data corresponding to words or phrases. The text converted from the audio data can be parsed by a data parsing engine 310 and made available to the automated assistant 304 as textual data that can be used to generate and/or identify command phrase(s), intent(s), action(s), slot value(s), and/or any other content specified by the user. In some implementations, output data provided by the data parsing engine 310 can be provided to a parameter engine 312 to determine whether the user provided an input that corresponds to a particular intent, action, and/or routine capable of being performed by the automated assistant 304 and/or an application or agent that is capable of being accessed via the automated assistant 304. For example, assistant data 338 can be stored at the server device and/or the computing device 302, and can include data that defines one or more actions capable of being performed by the automated assistant 304, as well as parameters necessary to perform the actions. The parameter engine 312 can generate one or more parameters for an intent, action, and/or slot value, and provide the one or more parameters to an output generating engine 314. The output generating engine 314 can use the one or more parameters to communicate with an assistant interface 320 for providing an output to a user, and/or communicate with one or more applications 334 for providing an output to one or more applications 334.

In some implementations, the automated assistant 304 can be an application that can be installed "on-top of" an operating system of the computing device 302 and/or can itself form part of (or the entirety of) the operating system of the computing device 302. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 302. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data.

NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 302 can include one or more applications 334 which can be provided by a third-party entity that is different from an entity that provided the computing device 302 and/or the automated assistant 304. An application state engine of the automated assistant 304 and/or the computing device 302 can access application data 330 to determine one or more actions capable of being performed by one or more applications 334, as well as a state of each application of the one or more applications 334 and/or a state of a respective device that is associated with the computing device 302. A device state engine of the automated assistant 304 and/or the computing device 302 can access device data 332 to determine one or more actions capable of being performed by the computing device 302 and/or one or more devices that are associated with the computing device 302. Furthermore, the application data 330 and/or any other data (e.g., device data 332) can be accessed by the automated assistant 304 to generate contextual data 336, which can characterize a context in which a particular application 334 and/or device is executing, and/or a context in which a particular user is accessing the computing device 302, accessing an application 334, and/or any other device or module.

While one or more applications 334 are executing at the computing device 302, the device data 332 can characterize a current operating state of each application 334 executing at the computing device 302. Furthermore, the application data 330 can characterize one or more features of an executing application 334, such as content of one or more graphical user interfaces being rendered at the direction of one or more applications 334. Alternatively, or additionally, the application data 330 can characterize an action schema, which can be updated by a respective application and/or by the automated assistant 304, based on a current operating status of the respective application. Alternatively, or additionally, one or more action schemas for one or more applications 334 can remain static, but can be accessed by the application state engine in order to determine a suitable action to initialize via the automated assistant 304.

The computing device 302 can further include an assistant invocation engine 322 that can use one or more trained machine learning models to process application data 330, device data 332, contextual data 336, and/or any other data that is accessible to the computing device 302. The assistant invocation engine 322 can process this data in order to determine whether or not to wait for a user to explicitly speak an invocation phrase to invoke the automated assistant 304, or consider the data to be indicative of an intent by the user to invoke the automated assistant—in lieu of requiring the user to explicitly speak the invocation phrase. For example, the one or more trained machine learning models can be trained using instances of training data that are based on scenarios in which the user is in an environment where multiple devices and/or applications are exhibiting various operating states. The instances of training data can be generated in order to capture training data that characterizes contexts in which the user invokes the automated assistant and other contexts in which the user does not invoke the automated assistant.

When the one or more trained machine learning models are trained according to these instances of training data, the assistant invocation engine 322 can cause the automated assistant 304 to detect, or limit detecting, spoken invocation phrases from a user based on features of a context and/or an environment. Additionally, or alternatively, the assistant invocation engine 322 can cause the automated assistant 304 to detect, or limit detecting for one or more assistant commands from a user based on features of a context and/or an environment. In some implementations, the assistant invocation engine 322 can be disabled or limited based on the computing device 302 detecting an assistant suppressing output from another computing device. In this way, when the computing device 302 is detecting an assistant suppressing output, the automated assistant 304 will not be invoked based on contextual data 336—which would otherwise cause the automated assistant 304 to be invoked if the assistant suppressing output was not being detected.

In some implementations, the automated assistant 304 can include a content annotation engine 316, which can generate annotation data based on information that is accessible to the automated assistant 304. For example, application data 330, device data 332, and/or contextual data 336 can be used to generate annotation data for annotating certain information accessible to the automated assistant 304. In some implementations, information provided by an operating system of the computing device 302 to a user can be a basis for annotating data available via a particular application 334. For example, a notification provided by an application 334 can be annotated using geolocation data from the operating system in order to establish additional context for the notification. When the content annotation engine 316 generates such annotations, the annotations can be referenced by the automated assistant 304 in response to a user providing an input that is relevant to the annotations. In this way, the user can rely on the automated assistant 304 to resolve ambiguities that may be apparent in user inputs, without necessarily relying on the user to provide extensive details. For example, the user can rely on the automated assistant 304 to identify a particular application, other than an OEM messaging application, for communicating a message to another person based on annotations that may be relevant to the message.

In some implementations, the automated assistant 304 can include an embedding processing engine 318 that can process data that is accessible to the automated assistant 304 in order to generate one or more embeddings based on the data. The embeddings can be generated using one or more trained machine learning models that can be trained using training data that is based on interactions between one or more users and one or more applications. Alternatively, or additionally, the one or more trained machine learning models can be trained using training data characterizing natural language content. For example, screenshots of an application 334 GUI can be captured, with prior permission from a user, and processed by the embedding processing engine 318 in order to generate respective embeddings for the screenshots and/or semantic understanding data. In some implementations, a screen shot can be processed using a trained machine learning model to generate an embedding, while textual data can be processed using a different trained machine learning model in order to generate another embedding. However, the embeddings can be mapped to a common latent space that can be used to categorize data with a new conversation and/or an existing conversation.

When an input is provided to contribute to an existing conversation (e.g., comments in a document editing application), the automated assistant 304 can identify an application 334 corresponding to the existing conversation. In some implementations, the automated assistant 304 can include an application operation engine 324, which can be used to process existing conversation data for a particular application in order to generate operation data. The operation data can then be communicated to the particular application and/or an operating system in order to cause the particular application to submit a message to the existing conversation.

Figure 4A:
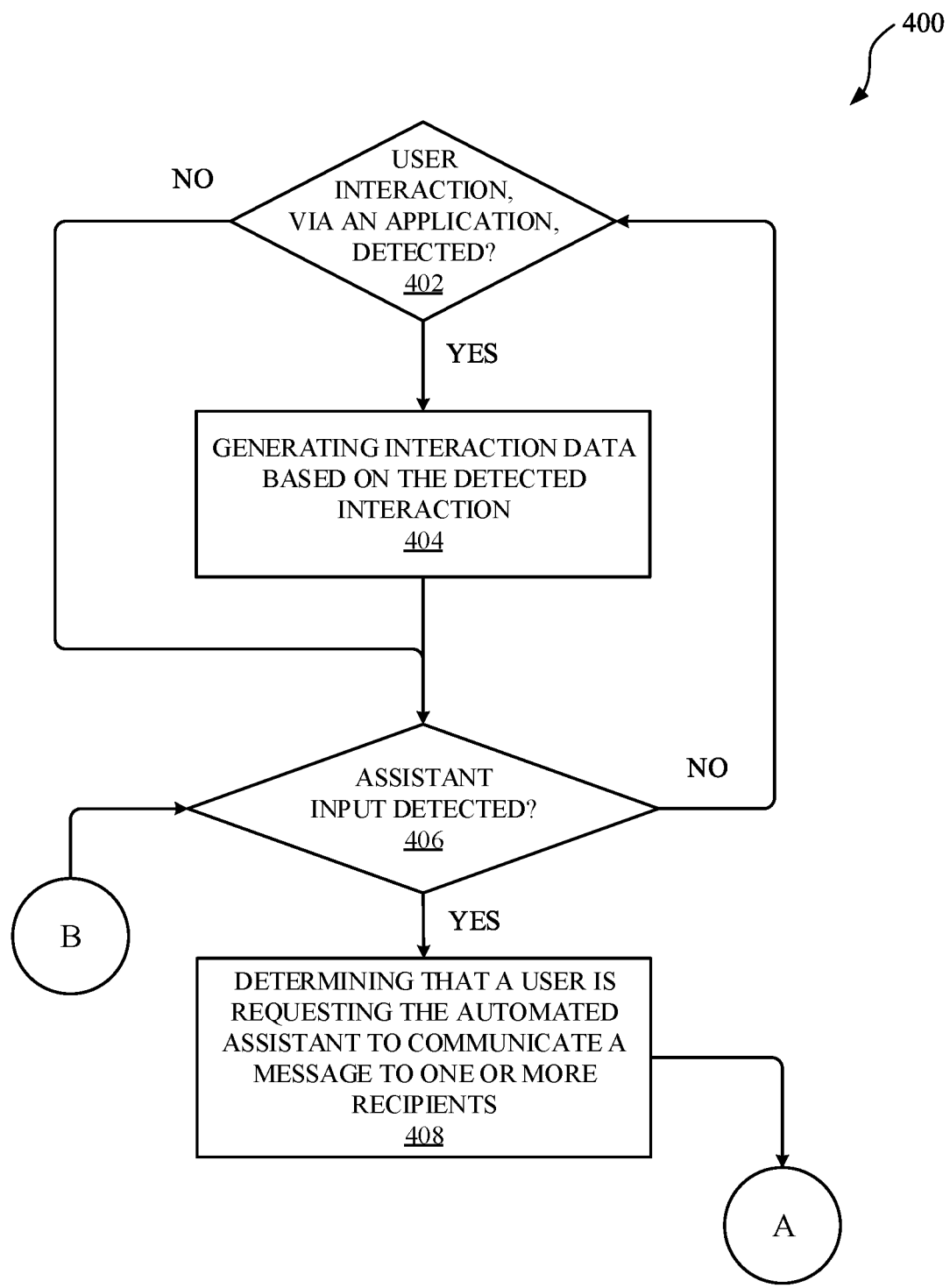
FIG. 4A and FIG. 4B illustrate methods for responding, via an automated assistant, to communications received via a third party application and/or other third party communication modality without necessarily specifying a particular application.
Figure 4B:
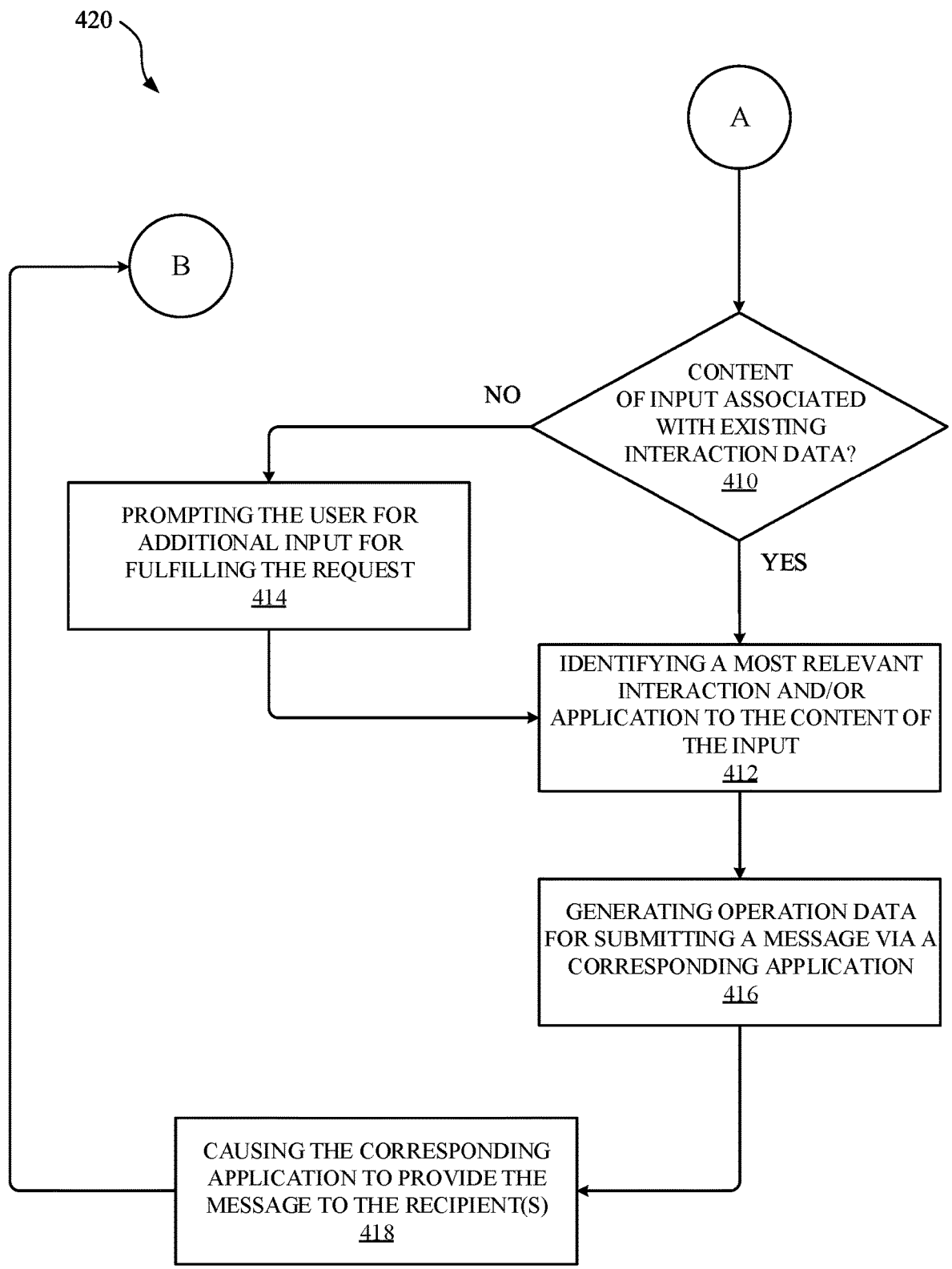

FIG. 4A and FIG. 4B illustrates a method 400 and a method 420 for responding, via an automated assistant, to communications received via a third party application and/or other third party communication modality without necessarily specifying a particular application. The method 400 can be performed by one or more computing devices, applications, and/or any other apparatus or module that can be associated with an automated assistant. The method 400 can include an operation 402 of determining whether user interaction, performed via an application, was detected. The user interaction to be detected by processing application data that is based on one or more prior interactions between a user and one or more different applications. In some instances, the application data can characterize a notification that is generated when a friend of a user posts a comment on a news application. In response, the news application can generate the notification, which may include natural language content such as, "This is great news. I'm looking forward to hearing more about this." When the automated assistant determines that the news application provided this notification, the automated assistant can determine that the user can provide a response to the comment from the friend via an interface of the news application. For example, the automated assistant can determine that the user can respond to the comment by processing a screenshot that includes the notification (e.g., where the screenshot includes a selectable GUI element labeled "reply"), API data associated with the news application, interaction data characterizing prior interactions between the user and the news application, and or any other data that can indicate the comment can be responded to by the user.

When the user interaction is detected, the method 400 can proceed from the operation 402, to an operation 404. Alternatively, when the automated assistant does not detect any user interaction with one or more different applications, a method 410 can proceed to an operation 406. Alternatively, the operation 402 and the operation 406 can be performed simultaneously and or irrespective of whether a condition of the operation 402 or of the operation 406 is satisfied. The operation 404 can include generating interaction data based on the detected interaction. For example, the interaction data can degenerated with prior permission from a user to indicate one or more participants in the interaction, the application in which the interaction was carried out, temporal data associated with the interaction, semantic understanding information, media associated with the interaction, and or any other information that can be associated with an interaction. In some implementations, the interaction data can include an embedding that is generated based on the interaction that was detected. For example, one or more trained machine learning models can be used to process data associated with the detective interaction in order to generate an embedding corresponding to the interaction. The embedding can thereafter be compared to other embeddings in latent space to determine a similarity or relevance to the other embeddings.

The method 400 can proceed from the operation 404 or the operation 402, to an operation 406, which can include determining whether an assistant input has been detected. An input to the automated assistant can be, for example, a spoken utterance, a GUI input, and/or any other type of input that can be provided to a computing device. For example, and in accordance with the aforementioned example, the automated assistant can detect, from the user, a spoken utterance such as, "Assistant, reply saying 'I think so too and we should get together soon to discuss.'" When the automated assistant detects this input, the method 400 can proceed from the operation 406 to an operation 408. Otherwise, when no assistant input is detected, the method 400 can return to the operation 402.

The operation 408 can include determining that the user is requesting the automated assistant to communicate a message to one or more recipients. For example, the automated assistant can process audio data corresponding to the spoken utterance in order to determine an intent of the user to participate in a particular conversation. In some implementations, natural language content of the assistant input can be processed to determine whether the message that the user wants to send is relevant to an interaction that has already been detected by the automated assistant. Alternatively, or additionally, the natural language content of the assistant input can be processed to identify a particular recipient, application, and/or any other properties that should be identified for communicating the message to a recipient.

The method 400 can proceed, via continuation element "A," to an operation 410 provided in FIG. 4B and method 420. The operation 410 can include determining whether content of the assistant input is associated with existing interaction data. In some implementations, in order to determine whether the assistant input is associated with existing interaction data, an embedding corresponding to the assistant input can be compared to one or more embeddings associated with one or more respective existing interactions. For example, a distance between embeddings in latent space can be determined in order to compare the distance to a threshold and/or identify an embedding with a shortest distance from the embedding associated with the assistant input. In some implementations, embeddings generated from the assistant inputs can be based on one or more trained machine learning models that are trained using training data that, with prior permission from each participant (or based on publicly available conversations (e.g., from online message boards)), can characterize messages of a conversation. For example, the training data can be based on two or more consecutive messages in each respective conversation. For instance, the training data can include training instances that each include a corresponding pair of prior message data (based on one or more earlier in time messages of a corresponding conversation) and current message data (based on a message, of the corresponding conversation, that is responsive to the earlier in time message(s). As one particular instance, the training data can be used to train two separate towers of a machine learning model, with one tower being used to process the prior message data of a pair to generate a prior message embedding and the other tower being used to process the current message data of the pair to generate a current message embedding, and the towers being updated on a loss that is based on a distance between the prior message embedding and the current message embedding (e.g., a loss that seeks to minimize the distance between the two embeddings). In these and other manners, embeddings resulting from processing individual messages from a single conversation will be rendered at closer distances in latent embedding space. Moreover, assistant inputs directed to furthering a particular conversation will also have a closer distance in latent space to existing embeddings for the particular conversation.

Alternatively, or additionally, content of the assistant input can be compared with content of one or more interactions to identify an interaction that has most similar content to the assistant input. For example, a "bag-of-words" method and/or other natural language processing method can be employed to determine a degree of similarity between a message that a user is requesting the automated assistant to send, and content that is available to the automated assistant (e.g., notification content, screenshot text, data generated by multiple different applications, etc.).

When content of the assistant input is determined to be associated with existing interaction data, the method 420 can proceed from operation 410 to an operation 412. However, when the content of the assistant input is determined to not be associated with existing interaction data, the method 420 can proceed from operation 410 to an operation 414. The operation 414 can include prompting the user for additional input for fulfilling the request. For example, the automated assistant may determine that the spoken utterance, "Assistant, reply saying 'I think so too and we should get together soon to discuss'" is not relevant enough to any existing interaction data (e.g., not relevant enough to the notification from the news application or other notifications, GUI data, etc.).

However, in order to identify a suitable application for fulfilling the request, the automated assistant can cause a prompt to be rendered for the user to provide additional input. For example, the prompt can be an audible output such as, "Ok, who is the recipient of the reply?" In response, the user can provide an additional input in order to provide the automated assistant with further context for identifying a particular application and/or recipient that the user is intending for the request. For example, the user can provide an additional spoken utterance such as, "The reply is for Durac," and, based on this additional spoken utterance, the automated assistant can identify an application and/or interaction that may be associated with the name "Durac." For example, the name "Durac" may not be mentioned in the content of the notification, and therefore may not have affected generation of an embedding based on the notification content. However, the automated assistant may nonetheless consider the news application to be most relevant because the name "Durac" is identified in application data associated with the news application.

The operation 412 can include identifying a most relevant interaction, and/or conversation identifier, to the content of the input. The automated assistant can employ one or more different techniques for determining a degree of relevance of the assistant input, and/or the additional input, to an application, interaction data, and/or conversation identifier accessible to the automated assistant. When the automated assistant identifies a particular interaction and/or conversation identifier that is most relevant to the assistant input, the method 420 can proceed to an operation 416 of generating operation data for submitting a message via a corresponding application. For example, an API and/or other interface between the automated assistant and the identified application (e.g., the news application) can be employed to generate operation data for submitting a message via the identified application. In some implementations, the operation data can characterize a script of one or more operations that the automated assistant can cause the identified application to execute in order for the message to be submitted. In some implementations, the operations identified in the script can be incorporated based on processing of interaction data using one or more trained machine learning models. The processing can assist with identifying particular inputs that were provided to a particular application in order to effectively cause the particular application to communicate a message.

When the operation data has been generated, the method 420 can proceed to an operation 418, which can include causing the corresponding application to provide the message to the recipients. For example, when the operation data is executed can cause the news application to receive the message from the user, the news application can cause a separate notification to be rendered at a separate instance of the news application that the friend of the user has access to. Thereafter, the friend can also employ their instance of the automated assistant at a separate computing device to reply to the message from the user. In this way, conversations among a variety of different applications can be facilitated through automated assistants, without necessarily requiring a user to directly touch a keyboard and/or touch interface to initialize a particular application.

Figure 5:
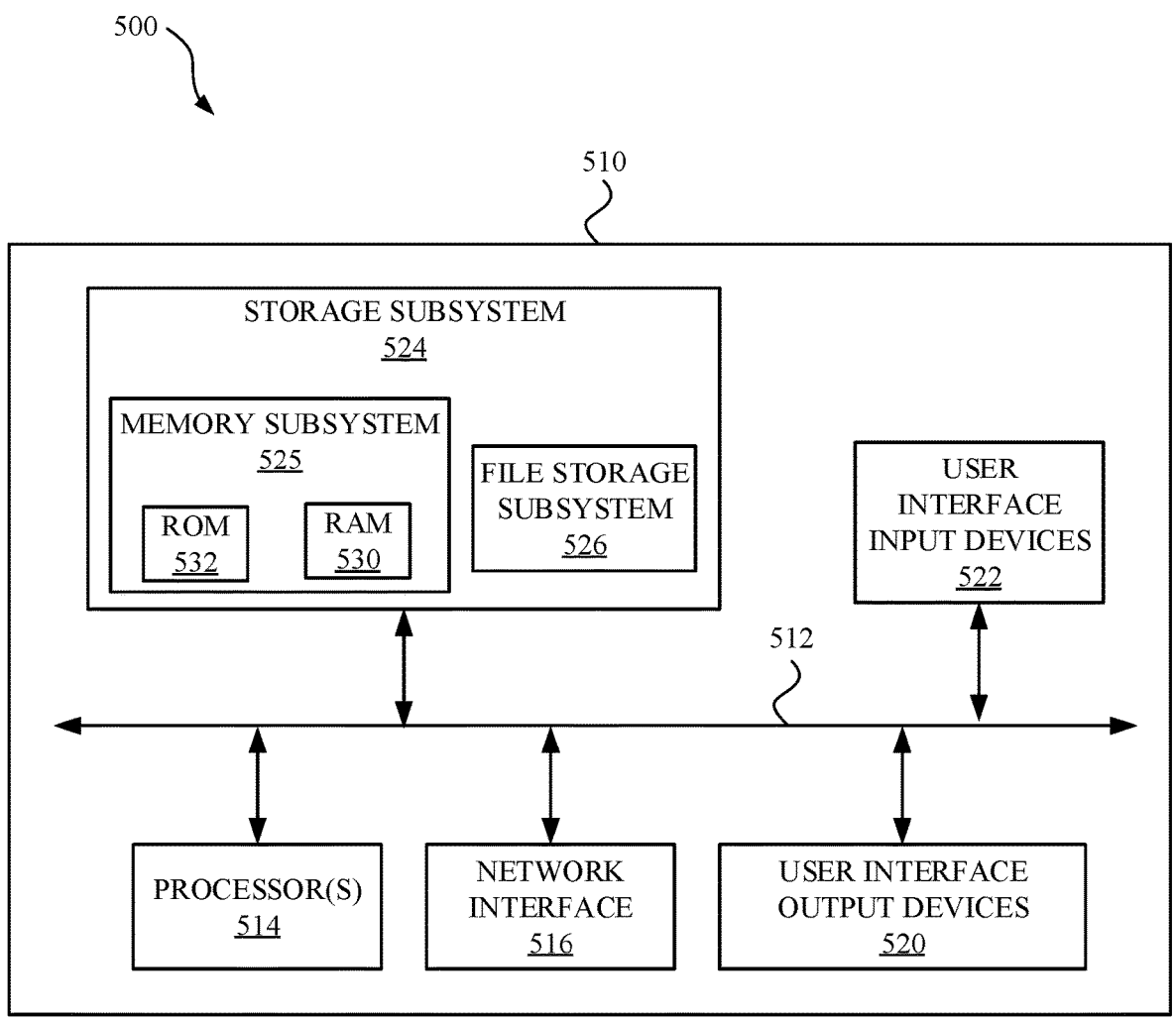
FIG. 5 is a block diagram of an example computer system.

FIG. 5 is a block diagram 500 of an example computer system 510. Computer system 510 typically includes at least one processor 514 which communicates with a number of peripheral devices via bus subsystem 512. These peripheral devices may include a storage subsystem 524, including, for example, a memory 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of method 400 and method 420, and/or to implement one or more of system 300, computing device 108, computing device 110, computing device 208, computing device 204, computing device 224, computing device 226, and/or any other application, device, apparatus, and/or module discussed herein.

These software modules are generally executed by processor 514 alone or in combination with other processors.

Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as receiving, at a computing device, a spoken utterance from a user wherein, the spoken utterance is directed to an automated assistant that is accessible via the computing device. The method can further include an operation of determining, based on the spoken utterance, that the user is requesting that the automated assistant communicate a message to another user, wherein the spoken utterance identifies natural language content to be incorporated into the message and the spoken utterance is void of an explicit identifier for a separate application to utilize for communicating the message. The method can further include an operation of comparing, based on the spoken utterance, existing application data to natural language content of the spoken utterance, wherein the existing application data is based on prior interactions between the user and two or more different applications. The method can further include an operation of determining, based on comparing the existing application data and the natural language content, to submit the message to the other user via a particular application. The method can further include an operation of causing, by the automated assistant and based on determining to submit the message via the particular application, an input to be provided to the particular application, wherein the input is provided to the particular application in furtherance of communicating the message to the other user.

In some implementations, the existing application data includes an embedding, and the method can further includes, prior to receiving the spoken utterance: generating the embedding based on an initial instance of application data provided by the particular application using one or more trained machine learning models. In some implementations, identifying the existing application data that corresponds to the natural language content includes: comparing the embedding to one or more existing application embeddings. In some implementations, at least one existing application embedding of the one or more existing application embeddings corresponds to the existing application data. In some implementations, the existing application data corresponds to other natural language content included in a notification generated by the particular application.

In some implementations, the method can further include an operation of: prior to receiving the spoken utterance: processing various application content from multiple different applications that are different from the automated assistant, and generating, based on the various application content, conversation embeddings, wherein each conversation embedding of the conversation embeddings is associated with a particular application interface that the user can employ to communicate with one or more separate users. In some implementations, identifying the existing application data that corresponds to the natural language content includes: generating, based on the natural language content, an embedding, and comparing the embedding to the conversation embeddings. In some implementations, at least one conversation embedding of the conversation embeddings corresponds to the existing application data.

In some implementations, causing the automated assistant to provide an input to the particular application includes: causing the particular application to render an interface that includes a text field, and causing at least a portion of the natural language content of the spoken utterance to be incorporated into the text field of the interface. In some implementations, the method can further include an operation of, prior to receiving the spoken utterance: determining that particular application has generated a notification based on the other user providing an additional input to a separate instance of the particular application, and generating, based on the notification, annotation data that correlates content of the additional input to an interaction identifier that is accessible to the automated assistant, wherein determining the existing application data that corresponds to the natural language content is performed further based on the annotation data. In some implementations, determining the existing application data that corresponds to the natural language content to be incorporated into the message includes: generating, based on the natural language content of the spoken utterance, semantic understanding data that characterizes subject matter of the natural language content, and comparing the semantic understanding data to various annotation data to determine a correspondence between the semantic understanding data and the various annotation data, wherein, the various annotation data includes the annotation data.

In other implementations, a method implemented by one or more processors is set forth as including operations such as determining, by an automated assistant, application content that is being rendered at an interface of a computing device, wherein the computing device provides access to the automated assistant. The method can further include an operation of generating, based on the application content, annotation data that provides a correspondence between the application content and an existing interaction identifier. The method can further include an operation of receiving, by the automated assistant, a user input that corresponds to a request for the automated assistant to submit a message to another user via a particular application, wherein, the user input identifies natural language content to be incorporated into the message and the user input is void of an explicit identifier for the particular application to be identified by the automated assistant. The method can further include an operation of determining, based on the user input and the annotation data, whether a particular interaction identifier of multiple different interaction identifiers corresponds to the user input, wherein the multiple different interaction identifiers include the particular interaction identifier, that is based on an interaction with the particular application, and an additional interaction identifier, that is based on a separate interaction with an additional application. In some implementations, the method can further include an operation of, when the particular interaction identifier is determined to correspond to the user input: generating, based on the user input, operation data for providing a message input to the particular application.

In some implementations, generating the annotation data includes: generating, using one or more trained machine learning models, a content embedding based on the application content. In some implementations, determining whether the particular interaction identifier of multiple different interaction identifiers corresponds to the user input includes: comparing the content embedding to one or more existing content embeddings generated based on other content associated with the particular application and the additional application. In some implementations, determining whether the particular interaction identifier of the multiple different interaction identifiers corresponds to the user input includes: determining whether a distance in latent space between the content embedding and another existing content embedding of the one or more existing content embeddings satisfies a threshold distance.

In some implementations, generating the annotation data includes: generating, using one or more trained machine learning models, semantic understanding data based on the application content, wherein determining whether the particular interaction identifier of multiple different interaction identifiers corresponds to the user input includes: generating, using the one or more trained machine learning models, other semantic understanding data based on the user input, and identifying the particular interaction identifier of multiple different interaction identifiers using the other semantic understanding data. In some implementations, generating the annotation data includes: determining that the application content identifies a contact identifier of another user that is associated with the particular interaction identifier, wherein the user input includes natural language content that identifies the contact identifier of the other user that the message is directed to. In some implementations, determining whether the particular interaction identifier of multiple different interaction identifiers corresponds to the user input includes: determining whether the other user has interacted with an instance of the particular application, wherein the user has access to a separate instance of the particular application.

In yet other implementations, a method implemented by one or more processors is set forth as including operations such as determining, at a computing device, that an instance of an application has received a first input from a user. The method can further include an operation of causing, based on the user input from the user, a notification to be rendered at a separate instance of the application at another computing device. The method can further include an operation of receiving, from an automated assistant, a second input that is based on the notification rendered at the separate instance of the application, wherein the second input is provided by the automated assistant in response to an interaction, between another user and the automated assistant, in which the other user did not expressly identifying the application. The method can further include an operation of causing, based on the second input from the automated assistant, another notification to be rendered at the instance of the application, wherein the other notification is based on natural language content provided by the other user to the automated assistant during the interaction.

In some implementations, causing the notification to be rendered at the separate instance of the application includes: providing the automated assistant with data that is based on the first input, wherein the data identifies the user that provided the first input. The method can further include an operation of: causing, based on the first input from the user, the automated assistant at the other computing device to generate annotation data based on the notification. In some implementations, the second input includes operation data that identifies multiple different operations for the instance of the application to perform based on the interaction between the other user and the automated assistant. The method can further include an operation of: causing, based on the second input from the automated assistant, a separate automated assistant to provide an output that characterizes the second input from the automated assistant.

We claim:

1. A method implemented by one or more processors, the method comprising:

receiving, at a computing device, a spoken utterance from a user,
  wherein the spoken utterance is directed to an automated assistant that is accessible via the computing device;
determining, based on the spoken utterance, that the user is requesting that the automated assistant communicate a message to another user,
  wherein the spoken utterance identifies natural language content to be incorporated into the message and the spoken utterance is void of an explicit identifier for a separate application to utilize for communicating the message;
comparing, based on the spoken utterance, existing application data to natural language content of the spoken utterance,
  wherein the existing application data is based on prior interactions between the user and two or more different applications;
generating, based on the natural language content of the spoken utterance, semantic understanding data that characterizes subject matter of the natural language content;
comparing the semantic understanding data to various annotation data to determine a correspondence between the semantic understanding data and the various annotation data;
determining, based on comparing the existing application data and the natural language content, that the existing application data corresponds to the natural language content to be incorporated into the message;
determining, based on determining that the existing application data corresponds to the natural language content to be incorporated into the message, to submit the message to the other user via a particular application; and
causing, by the automated assistant and based on determining to submit the message via the particular application, an input to be provided to the particular application,
  wherein the input is provided to the particular application in furtherance of communicating the message to the other user;
determining, prior to receiving the spoken utterance, that the particular application has generated a notification based on the other user providing an additional input to a separate instance of the particular application, and
generating, based on the notification, particular annotation data of the various annotation data that correlates content of the additional input to an interaction identifier that is accessible to the automated assistant,
  wherein determining that the existing application data corresponds to the natural language content is further based on the particular annotation data.

2. The method of claim 1, wherein the existing application data includes an embedding, and the method further comprises:
  prior to receiving the spoken utterance:
    generating the embedding based on an initial instance of application data provided by the particular application using one or more trained machine learning models.

3. The method of claim 2, wherein identifying the existing application data that corresponds to the natural language content includes:
  comparing the embedding to one or more existing application embeddings,
    wherein at least one existing application embedding of the one or more existing application embeddings corresponds to the existing application data.

4. The method of claim 1, wherein the existing application data corresponds to other natural language content included in a notification generated by the particular application.

5. The method of claim 1, further comprising:
  prior to receiving the spoken utterance:
  processing various application content from multiple different applications that are different from the automated assistant, and
  generating, based on the various application content, conversation embeddings,
    wherein each conversation embedding of the conversation embeddings is associated with a particular application interface that the user can employ to communicate with one or more separate users.

6. The method of claim 5, wherein identifying the existing application data that corresponds to the natural language content includes:
  generating, based on the natural language content, an embedding, and
  comparing the embedding to the conversation embeddings,
    wherein at least one conversation embedding of the conversation embeddings corresponds to the existing application data.

7. The method of claim 1, wherein causing the automated assistant to provide an input to the particular application includes:
  causing the particular application to render an interface that includes a text field, and
  causing at least a portion of the natural language content of the spoken utterance to be incorporated into the text field of the interface.

8. A method implemented by one or more processors, the method comprising:
  determining, by an automated assistant, application content that is being rendered at an interface of a computing device,
    wherein the computing device provides access to the automated assistant;
  generating, based on the application content, annotation data that provides a correspondence between the application content and an existing interaction identifier,
    wherein generating the annotation data includes:
    generating, using one or more trained machine learning models, a content embedding based on the application content;
  receiving, by the automated assistant, a user input that corresponds to a request for the automated assistant to submit a message to another user via a particular application,
    wherein the user input identifies natural language content to be incorporated into the message and the user input is void of an explicit identifier for the particular application to be identified by the automated assistant;
  determining, based on the user input and the annotation data, whether a particular interaction identifier of multiple different interaction identifiers corresponds to the user input,
    wherein the multiple different interaction identifiers include the particular interaction identifier, that is based on an interaction with the particular application, and an additional interaction identifier, that is based on a separate interaction with an additional application, and
wherein determining whether the particular interaction identifier corresponds to the user input includes:
comparing the content embedding to one or more existing content embeddings generated based on other content associated with the particular application and the additional application, and
determining whether a distance in latent space between the content embedding and another existing content embedding of the one or more existing content embeddings satisfies a threshold distance; and
when the particular interaction identifier is determined to correspond to the user input:
generating, based on the user input, operation data for providing a message input to the particular application.

9. The method of claim 8,
wherein generating the annotation data includes:
generating, using one or more trained machine learning models, semantic understanding data based on the application content; and
wherein determining whether the particular interaction identifier of multiple different interaction identifiers corresponds to the user input includes:
generating, using the one or more trained machine learning models, other semantic understanding data based on the user input, and
identifying the particular interaction identifier of multiple different interaction identifiers using the other semantic understanding data.

10. The method of claim 8,
wherein generating the annotation data includes:
determining that the application content identifies a contact identifier of another user that is associated with the particular interaction identifier,
wherein the user input includes natural language content that identifies the contact identifier of the other user that the message is directed to.

11. The method of claim 10, wherein determining whether the particular interaction identifier of multiple different interaction identifiers corresponds to the user input includes:
determining whether the other user has interacted with an instance of the particular application,
wherein the user has access to a separate instance of the particular application.

12. A method implemented by one or more processors, the method comprising:
determining, at a computing device, that an instance of an application has received a first input from a user;
causing, based on the user input from the user, a notification to be rendered at a separate instance of the application at another computing device;
receiving, from an automated assistant, a second input that is based on the notification rendered at the separate instance of the application,
wherein the second input is provided by the automated assistant in response to an interaction, between another user and the automated assistant, in which the other user did not expressly identify the application; and
causing, based on the second input from the automated assistant, another notification to be rendered at the instance of the application,
wherein the other notification is based on natural language content provided by the other user to the automated assistant during the interaction.

13. The method of claim 12, wherein causing the notification to be rendered at the separate instance of the application includes:
providing the automated assistant with data that is based on the first input, wherein the data identifies the user that provided the first input.

14. The method of claim 12, further comprising:
causing, based on the first input from the user, the automated assistant at the other computing device to generate annotation data based on the notification.

15. The method of claim 12, wherein the second input includes operation data that identifies multiple different operations for the instance of the application to perform based on the interaction between the other user and the automated assistant.

16. The method of claim 12, further comprising:
causing, based on the second input from the automated assistant, a separate automated assistant to provide an output that characterizes the second input from the automated assistant.

* * * * *